(12) United States Patent
Xie

(10) Patent No.: US 10,809,957 B2
(45) Date of Patent: Oct. 20, 2020

(54) CONTROL METHOD AND APPARATUS FOR DISPLAY SCREEN

(71) Applicant: SHENZHEN ROYOLE TECHNOLOGIES CO., LTD., Shenzhen (CN)

(72) Inventor: Jun Xie, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/515,305

(22) Filed: Jul. 18, 2019

(65) Prior Publication Data

US 2019/0339919 A1 Nov. 7, 2019

Related U.S. Application Data

(63) Continuation of application No. PCT/CN2017/079097, filed on Mar. 31, 2017.

(51) Int. Cl.
*G09G 5/00* (2006.01)
*G06F 3/14* (2006.01)
(Continued)

(52) U.S. Cl.
CPC ............. *G06F 3/14* (2013.01); *G01J 1/4204* (2013.01); *G01J 1/44* (2013.01); *G06F 3/011* (2013.01);
(Continued)

(58) Field of Classification Search
CPC .......... G06F 3/01; G06F 3/011; G06F 3/0487; G06F 3/14; G06F 13/1668;
(Continued)

(56) References Cited

U.S. PATENT DOCUMENTS 7,796,179 B2 * 9/2010 Fujinawa .............. G02F 1/1347
345/102
8,803,923 B2 * 8/2014 Shimizu ............... G09G 3/3426
345/690
(Continued)

FOREIGN PATENT DOCUMENTS

CN 102265252 A * 11/2011 ................ G01J 5/10
CN 102265252 A 11/2011
(Continued)

OTHER PUBLICATIONS

International Search Report dated Dec. 28, 2017, issued in corresponding International Application No. PCT/CN2017/079097.

*Primary Examiner* — Joe H Cheng
(74) *Attorney, Agent, or Firm* — Hauptman Ham, LLP

(57) ABSTRACT

A control method and apparatus for a display screen. The method comprises: obtaining target light quantity data collected by a light sensor during a process of wearing a terminal device by a first user (101); updating a first light quantity data historical value file by using the target light quantity data to obtain a second light quantity data historical value file (102); determining a light quantity data threshold by using the second light quantity data historical value file (103); controlling a display state of the display screen of the terminal device according to the light quantity data threshold (104). The present disclosure can conveniently adjust the light quantity data threshold, so as to control the display state of the display screen of the terminal device accurately.

20 Claims, 2 Drawing Sheets

(51) Int. Cl.
    *G01J 1/42*     (2006.01)
    *G01J 1/44*     (2006.01)
    *G06F 3/01*     (2006.01)
    *G06F 13/16*     (2006.01)

(52) U.S. Cl.
    CPC .... *G06F 13/1668* (2013.01); *G06F 2211/002* (2013.01)

(58) Field of Classification Search
    CPC ............... G06F 2211/002; G09G 5/00; G09G 2320/08; G09G 2354/00; G09G 2360/14; G01J 1/42; G01J 1/4204; G01J 1/44
    See application file for complete search history.

(56) References Cited

U.S. PATENT DOCUMENTS

| | | | |
|---|---|---|---|
| 8,829,798 B2 * | 9/2014 | Takanashi | H05B 45/20 315/158 |
| 2002/0030637 A1 * | 3/2002 | Mann | G02B 27/017 345/8 |
| 2002/0050987 A1 * | 5/2002 | Sakashita | H04N 5/7416 345/204 |
| 2004/0135827 A1 * | 7/2004 | Kuramata | H01J 9/42 345/30 |
| 2010/0097412 A1 * | 4/2010 | Okabe | H05B 45/40 345/691 |
| 2011/0052231 A1 * | 3/2011 | Kitao | G03G 15/0194 399/49 |
| 2016/0111048 A1 * | 4/2016 | Matsui | H05B 45/10 315/151 |
| 2016/0161339 A1 | 6/2016 | Tan | |
| 2017/0277031 A1 * | 9/2017 | Miyakawa | G02B 26/0833 |
| 2018/0249151 A1 * | 8/2018 | Freeman | A61F 9/00 |
| 2019/0285735 A1 * | 9/2019 | Hamaguchi | G01S 7/4814 |

FOREIGN PATENT DOCUMENTS

| | | | | |
|---|---|---|---|---|
| CN | 102843469 A | | 12/2012 | |
| CN | 104750220 A | * | 7/2015 | ............. G06F 1/325 |
| CN | 104750220 A | | 7/2015 | |
| CN | 105302541 A | | 2/2016 | |
| CN | 105487372 A | * | 4/2016 | ............. G04G 21/02 |
| CN | 105487372 A | | 4/2016 | |

\* cited by examiner

CONTROL METHOD AND APPARATUS FOR DISPLAY SCREEN

CROSS-REFERENCE TO RELATED APPLICATION

This application is a continuation of PCT/CN2017/079097, filed Mar. 31, 2017, the disclosure of which is hereby incorporated by reference in its entirety.

TECHNICAL FIELD

This present disclosure relates to electronic technology fields, and in particular, to a control method and apparatus for a display screen.

BACKGROUND

With advancement and development of technology, terminal devices such as head-mounted display devices can provide immersive multimedia playback experiences, making such terminal devices more and more popular. Currently, there exists such a terminal device equipped with some kind of sensors to detect whether the user has worn the terminal device. A display state of the display screen, such as a switch state, is controlled by setting a data threshold.

However, due to differences in face shapes, wearing tightness, etc. of different users, and aging of the terminal device over time, the preset data threshold cannot be applied to all users, and cannot be further applied to all stages of using process of the device, which causes an error in controlling the display state of the display screen. How to adjust the data threshold conveniently to adjust the display state of the display screen of the terminal device has become an urgent problem to be solved in a process of using the terminal device for individual differences and usage time of different users.

SUMMARY

The embodiments of the present disclosure disclose a control method and apparatus for a display screen, which can conveniently adjust a light quantity data threshold to accurately control a display state of the display screen of the terminal device.

A first aspect of the embodiments of the present disclosure discloses a control method for a display screen, including following steps.

Target light quantity data collected by a light sensor during a process of wearing a terminal device by a first user is obtained.

A first light quantity data history value file is updated by using the target light quantity data to obtain a second light quantity data historical value file.

A light quantity data threshold is determined by using the second light quantity data history value file.

A display state of the display screen of the terminal device is controlled according to the light quantity data threshold.

A second aspect of the embodiments of the present disclosure discloses a control apparatus for a display screen, including an obtaining module, an updating module, a determining module and a controlling module.

The obtaining module is configured to obtain target light quantity data collected by a light sensor during a process of wearing a terminal device by a first user.

The updating module is configured to update a first light quantity data historical value file by using the target light quantity data to obtain a second light quantity data historical value file.

The determining module is configured to determine a light quantity data threshold by using the second light quantity data historical value file.

The controlling module is configured to control a display state of the display screen of the terminal device according to the light quantity data threshold.

A third aspect of the embodiments of the present disclosure discloses a non-transitory computer-readable storage medium storing at least one computer program which, when executed by a processor, causes the processor to carry out actions: obtaining target light quantity data collected by a light sensor during a process of wearing a terminal device by a first user; updating a first light quantity data historical value file by using the target light quantity data to obtain a second light quantity data historical value file; determining a light quantity data threshold by using the second light quantity data historical value file; and controlling a display state of the display screen of the terminal device according to the light quantity data threshold.

The embodiments of the present disclosure obtain the target light quantity data collected by the light sensor in the process of wearing the terminal device by the first user, and use the target light quantity data to update the first light quantity data historical value file to obtain the second light quantity data historical value file, and determine the light quantity data threshold by using the second light quantity data historical value file, and further control the display state of the display screen of the terminal device according to the light quantity data threshold. Therefore, the light quantity data threshold can be conveniently adjusted to control the display state of the display screen of the terminal device accurately.

BRIEF DESCRIPTION OF THE ACCOMPANYING DRAWINGS

To describe technology solutions in the embodiments of the present disclosure more clearly, the following briefly introduces the accompanying drawings required for describing the embodiments. Obviously, the accompanying drawings in the following description show merely some embodiments of the present disclosure, those of ordinary skilled in the art may also derive other obvious variations based on these accompanying drawings without creative efforts.

DETAILED DESCRIPTION OF ILLUSTRATED EMBODIMENTS

The technical solution in the embodiments of the present disclosure will be described clearly and completely hereinafter with reference to the accompanying drawings in the embodiments of the present disclosure. Obviously, the described embodiments are merely some but not all the embodiments of the present disclosure. All other embodiments obtained by a person of ordinary skill in the art based on the embodiments of the present disclosure without creative efforts shall all fall within the protection scope of the present disclosure.

The embodiments of the present disclosure disclose a control method and apparatus for a display screen, which are used for conveniently adjusting a light quantity data threshold, so as to accurately control a display state of a display screen of a terminal device. The details are described as follows.

The terminal device described in the embodiments of the present disclosure may specifically include, but is not limited to, a head mounted display device equipped with a display screen.

Figure 1:
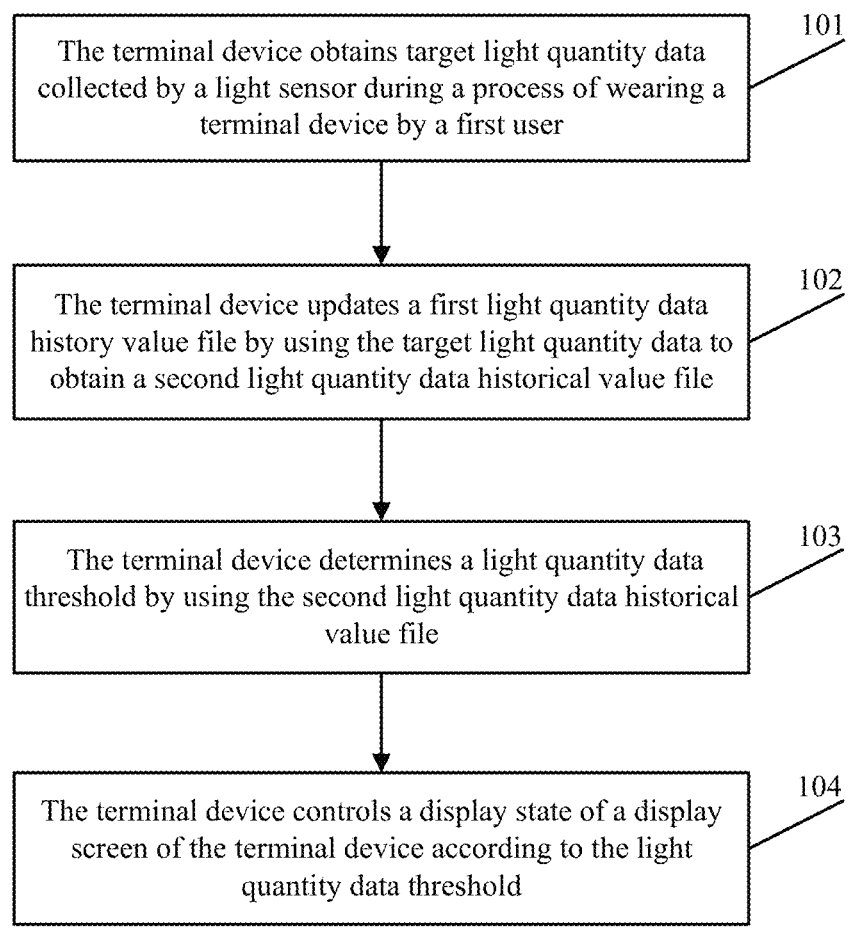
FIG. 1 is a schematic flowchart of a control method for a display screen according to one embodiment of the present disclosure.

Referring to FIG. 1, a schematic flowchart diagram of a control method for a display screen according to one embodiment of the present disclosure is illustrated. The control method of the display screen described in this embodiment includes following steps.

At block 101, the terminal device obtains target light quantity data collected by a light sensor during a process of wearing a terminal device by a first user.

In some possible implementations, the terminal device may perform following steps before performing the block 101.

The terminal device obtains a plurality of pieces of light quantity data collected by the light sensor during the process of wearing the terminal device by a second user, and repeatedly writes the plurality of pieces of light quantity data into a first light quantity data historical value file according to preset writing times.

The second user may specifically be a developer of the terminal device. The light sensor may specifically emit infrared light, receive a reflected infrared light, and calculate a reflection amount of the infrared light (recorded as the light quantity data). During the process of the second user wearing the terminal device repeatedly, the terminal device uses the light sensor to collect the light quantity data when the second user wears the terminal device and the light quantity data when the second user takes off the terminal device; and writes the light quantity data when the terminal device is worn and the light quantity data when the terminal device is taken off repeatedly into the first light quantity data historical value file according to the preset writing times. For example, when the second user wears the terminal device 5 times, the light sensor can collect five corresponding pieces of light quantity data of the second user wearing the terminal device 5 times, and five corresponding pieces of light quantity data of the second user taking off the terminal device 5 times. The 10 pieces of light quantity data including five corresponding pieces of light quantity data of the second user wearing the terminal device 5 times and five corresponding pieces of light quantity data of the second user taking off the terminal device 5 times are repeatedly written into the first light quantity data history value file according to the preset writing times of 20, so the first light quantity data historical value file may include 100 light quantity data to reduce an influence of a single light quantity data error on the overall light quantity data. Of course, if the times that the second user wears the terminal device is relatively greater, the collected multiple pieces of light quantity data can be written into the first light quantity data historical value file at one time, without having to repeat multiple writing times. For example, the second user is allowed to wear the terminal device 50 times; the light sensor collects 50 pieces of light quantity data corresponding to the second user wearing the terminal device 50 times, and 50 pieces of light quantity data corresponding to the second user taking off the terminal device 50 times; and the 100 pieces of light quantity data including the 50 pieces of light quantity data corresponding to the second user wearing the terminal device 50 times and the 50 pieces of light quantity data corresponding to the second user taking off the terminal device 50 times are once written into the first light quantity data historical value file.

In addition, the terminal device may further determine an initial value of the light quantity data threshold according to the plurality of pieces of light quantity data collected by the light sensor in the process of the second user wearing the terminal device. In a subsequent use of the terminal device, the terminal device may control the display state of the display screen according to the light quantity data threshold. Specifically, if the light quantity data collected by the light sensor reaches the initial value of the light quantity data threshold, the terminal device determines that the user wears the terminal device, and controls the display screen to be in a first display state. If the light quantity data collected by the light sensor is less than the initial value of the light quantity data threshold, the terminal device determines that the current user takes off the terminal device and controls the display screen to be in a second display state.

It should be noted that the display state of the display screen described in the embodiments of the present disclosure may specifically refer to a switch state. Of course, the display state of the display screen may also refer to a sleep state, a screen saver state, a screen brightness, and the like. The first display state and the second display state have an opposite relationship. For example, when the display state is the switch state, the first display state corresponds to the user wearing the terminal device, and the first display state refers opening the display screen; the second display state corresponds to the user taking off the terminal device, and the second display state refers to closing the display screen. For another example, when the display state is the sleep state, the first display state corresponds to the user wearing the terminal device, and the first display state refers to the display screen not sleeping; the second display state corresponds to the user taking off the terminal device and the second display state refers to the display screen sleeping. For another example, when the display state is the screen saver state, the first display state corresponds to the user wearing the terminal device, and the first display state refers to the display screen not displaying a screen saver image; the second display state corresponds to the user taking off the terminal device and the second display state refers to the display screen displaying the screen saver image. For another example, when the display state is the screen brightness, the first display state corresponds to the user wearing the terminal device, and the first display state refers to the screen brightness of the display screen being greater than or equal to a preset first brightness; the second display state corresponds to the user taking off the terminal device, and the second display state refers to the screen brightness of the display screen being less than or equal to a preset second brightness; and the preset first brightness is greater than the preset second brightness.

In a specific implementation, the first user may be an ordinary consumer, and the target light quantity data may include a maximum value and a minimum value of the collected light quantity data. In the process of the first user wearing the terminal device (ie, from the first user wearing the terminal device to the first user taking off the terminal device), the terminal device continuously collects the light quantity data through the light sensor, and determines the maximum value of the light quantity data and the minimum value of the light quantity data from the continuously collected light quantity data. The maximum value of the light quantity data generally corresponds to the first user wearing the terminal device, and the minimum value of the light quantity data generally corresponds to the first user taking off the terminal device.

At block 102, the terminal device updates the first light quantity data history value file by using the target light quantity data to obtain a second light quantity data historical value file.

In a specific implementation, the terminal device may add the maximum value and the minimum value of the collected light quantity data to the first light quantity data historical value file, and further remove two pieces of light quantity data stored in preset positions from the first light quantity data historical value file, so as to obtain the second light quantity data historical value file. The light quantity data with earlier acquisition time in the first light quantity data historical value file can be replaced by using newly collected target light quantity data, thereby realizing recording of the newly collected target light quantity data, and updating of the first light quantity data history value file. For example, the terminal device may add the maximum value and the minimum value of the newly collected light quantity data to a head of the first light quantity data history value file, and remove two light quantity data at a tail of the first light quantity data history value file. Of course, the terminal device may also add the maximum value and the minimum value of the newly collected light quantity data to the tail of the first light quantity data historical value file, and remove the two light quantity data at the head of the first light quantity data historical value file, which is not limited by the present disclosure.

At block 103, the terminal device determines the light quantity data threshold by using the second light quantity data historical value file.

In a specific implementation, the terminal device sorts the light quantity data included in the second light quantity data historical value file to obtain a third light quantity data historical value file. The light quantity data included in the third light quantity data historical value file excluded from the light quantity data at a first and last position of the third light quantity data historical value file is used as a plurality of preset classification points. The light quantity data included in the third light quantity data historical value file is classified into two categories respectively by using the plurality of preset classification points, that is, the light quantity data from a first light quantity data to a light quantity data corresponding to the classification points in the third light quantity data historical value file is classified into one category, and a next light quantity data of the light quantity data corresponding to the classification points to a last light quantity data is classified into one category. The terminal device obtains an interclass variance of the two categories of light quantity data obtained by classifying the third light quantity data historical value file by using the plurality of classification points; and determines a target classification point from the plurality of classification points. The interclass variance corresponding to the target classification point is the largest. The interclass variance is used to determine a quality of a classification result. The larger the interclass variance, the larger the overall difference between the two categories of light quantity data, and the better the corresponding classification effect. The third light quantity data history value file is classified into two categories of light quantity data which respectively correspond to the light quantity data when the terminal device is worn and the light quantity data when the terminal device is taken off. The light quantity data threshold can be re-determined by using the target classification point with a best classification effect (that is, the interclass variance is the largest).

Furthermore, the specific manner in which the terminal device uses the target classification point to re-determine the light quantity data threshold may be: the terminal device obtains a light quantity data corresponding to the target classification point and a next light quantity data of the light quantity data corresponding to the target classification point; and sets the light quantity data threshold to be greater than the light quantity data corresponding to the target classification point, and less than the next light quantity data of the light quantity data corresponding to the target classification point; or sets the light quantity data threshold to be an average value of the light quantity data corresponding to the target classification point and the next light quantity data of the light quantity data corresponding to the target classification point.

In some possible implementation manners, the specific manner in which the terminal device uses the target classification point to re-determine the light quantity data threshold may further be: the terminal device classifies the sorted light quantity data included in the light quantity data historical value file into two categories (set as the first category and the second category) by using the target classification point; calculates an average value of the first category of light quantity data and an average value of the second category of light quantity data, and then determines the light quantity data threshold according to the average values of the two categories of light quantity data. For example, the light quantity data threshold is set as an average value of the average value of the first category of light quantity data and the average value of the second category of light quantity data. Therefore, a circumstance that the collected light quantity data (such as the light quantity data corresponding to the target classification point and/or the next light quantity data of the light quantity data corresponding to the target classification point) may be partially error which may result the obtained light quantity data threshold unreasonable, and may further result the terminal device not accurately controlling the display state of the display screen, can be avoided.

For example, taking the first light quantity data history value file including 10 pieces of light quantity data as an example, the data including in the first light quantity data history value file is: (50, 150, 50, 150, 50, 150, 50, 150, 50, 150). The target light quantity data obtaining by the terminal device includes a maximum value 160 and a minimum value 60, respectively. The terminal device may add 60 and 160 to the head of the first light quantity data history value file, and remove the two light quantity data 50 and 150 at the tail of the first light quantity data history value file. Then, the data of the obtained second light quantity data history value file is: (60, 160, 50, 150, 50, 150, 50, 150, 50, 150). The light quantity data included in the second light quantity data history value file is sorted from small to large to obtain a third light quantity data historical value file. The light quantity data included in the third light quantity data historical value file is recorded as an array [10], and then the array[10]={50, 50, 50, 50, 60, 150, 150, 150, 150, 160}. The first nine elements in the array [10] are respectively used as classification points to classify the light quantity data included in the third light quantity data historical value file into two categories. The interclass variance of the two categories of light quantity data is obtained. For example, the fifth element array[4]=60 is used as the classification point, the 10 elements in the array [10] can be classified into the first five elements (ie 50, 50, 50, 50, 60) as the first category of light quantity data, and the last five elements (ie 150, 150, 150, 150, 160) as the second category of light quantity data. The interclass variance between the first category of light quantity data and the second category of light quantity data is calculated according to formulas: interclass variance $g=w_1*w_2*(u_1-u_2)^2$; where, $w_1$ refers to a percentage of the first category of light quantity data to the total light quantity data; $w_2$ refers to a percentage of the second category of light quantity data to the total light quantity data; $u_1$ refers to an average value of the first category of light quantity data; $u_2$ refers to an average value of the second category of light quantity data. As known from the calculation, when the fifth element array[4]=60 is used as the classification point, the corresponding interclass variance is the largest, that is, the target classification point is the fifth element 60. At this time, the light quantity data threshold can be taken between the fifth element 60 and the sixth element 150. For example, the light quantity data threshold is taken as 90, or the light quantity data threshold may also be taken as an average value (60+150)/2=105 of the fifth element 60 and the sixth element 150.

In some feasible implementation manners, in order to avoid an error of partial collected light quantity data (such as the light quantity data corresponding to the target classification point and/or the next light quantity data of the light quantity data corresponding to the target classification point) to cause the obtained light quantity data threshold to be unreasonable, the terminal device can set the light quantity data threshold to be an average value of the first category of light quantity data and the average value of the second category of light quantity data, that is, the light quantity data threshold is =(52+152)/2=102. In addition, if the maximum value and the minimum value included in the target light quantity data obtained by the terminal device have a larger difference from a normal condition during a subsequent use of the terminal device, for example, the maximum value and the minimum value included in the target light quantity data are 50 and 50, respectively. The second light quantity data historical value file is updated by using 50 and 50 to obtain a light quantity data historical value file including light quantity data: (50, 50, 60, 160, 50, 150, 50, 150, 50, 150). The light quantity data threshold recalculated by using the above calculation formula is =(51.7+152.5)/2=102.1. It can be seen that when the target light quantity data obtained by the terminal device is in error, the difference between the recalculated light quantity data threshold value 102.1 and the previously calculated light quantity data threshold value 102 is very small. Therefore, the determination scheme of the light quantity data threshold provided by the embodiment of the present disclosure has high robustness and strong system stability.

At block 104, the terminal device controls a display state of the display screen of the terminal device according to the light quantity data threshold.

In a specific implementation, the terminal device obtains the current light quantity data collected by the light sensor in real time, and compares the current light quantity data with the determined light quantity data threshold. If the current light quantity data is smaller than the light quantity data threshold, the terminal device determines that the user has removed the terminal device, and controls the display screen to be in the first display state; if the current light quantity data is greater than or equal to the light quantity data threshold, the terminal device determines that the user wears the terminal device, and controls the display screen to be in the second display state, thereby implementing an exact control of the display state of the display screen of the terminal device.

In the embodiments of the present disclosure, the terminal device obtains the target light quantity data collected by the light sensor in the process of the first user wearing the terminal device, and uses the target light quantity data to update the first light quantity data historical value file, so as to obtain the second light quantity data historical value, and determines the light quantity data threshold by using the second light quantity data historical value file, and further controls the display state of the display screen of the terminal device according to the light quantity data threshold, so that the light quantity data threshold can be conveniently adjusted to automatically adapt different users and can control the display state of the display screen of the terminal device accurately.

Figure 2:
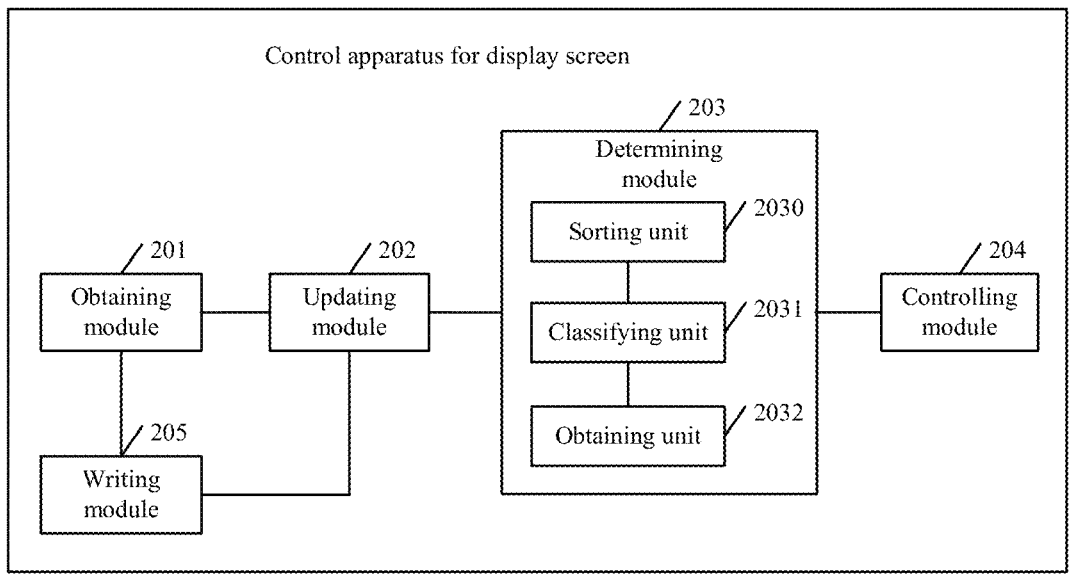
FIG. 2 is a schematic structural diagram of a control apparatus for a display screen according to one embodiment of the present disclosure.

FIG. 2 is a schematic structural diagram of a display screen control apparatus according to one embodiment of the present disclosure. The control apparatus for the display screen described in this embodiment includes an obtaining module 201, an updating module 202, a determining module 203, and a controlling module 204.

The obtaining module 201 is configured to obtain target light quantity data collected by a light sensor during the process of wearing the terminal device by the first user.

The updating module 202 is configured to update a first light quantity data historical value file by using the target light quantity data to obtain a second light quantity data historical value file.

The determining module 203 is configured to determine a light quantity data threshold by using the second light quantity data historical value file.

The controlling module 204 is configured to control a display state of the display screen of a terminal device according to the light quantity data threshold.

In some possible implementations, the target light quantity data includes a maximum value and a minimum value of the collected light quantity data, and the updating module 202 is specifically configured to add the maximum value and the minimum value of the collected light quantity data to the first light quantity data history value file, and remove two pieces of light quantity data stored in preset positions from the first light quantity data history value file to obtain a second light quantity data history value file.

In some possible implementations, the determining module 203 includes a sorting unit 2030, a classifying unit 2031, and an obtaining unit 2032.

The sorting unit 2030 is configured to sort the light quantity data included in the second light quantity data historical value file to obtain a third light quantity data historical value file.

The classifying unit 2031 is configured to separately classify the light quantity data included in the third light quantity data historical value file into two categories by using a plurality of preset classification points.

The obtaining unit 2032 is configured to obtain an interclass variance of the two categories of light quantity data.

The obtaining unit 2032 is further configured to determine a target classification point from a plurality of preset classification points, and determine a light quantity data threshold by using the target classification point, where the interclass variance corresponding to the target classification point is the largest.

In some possible implementations, the obtaining unit 2032 is specifically configured to obtain an average value of each of the two categories of light quantity data classified by the target classification point; determine the light quantity data threshold according to the average values of the two categories of light quantity data.

In some possible implementations, the controlling module 204 is specifically configured to obtain a current light quantity data collected by the light sensor.

If the current light quantity data is smaller than the light quantity data threshold, the controlling module 204 is specifically configured to control the display screen of the terminal device to be in the first display state.

If the current light quantity data is greater than or equal to the light quantity data threshold, the controlling module 204 is specifically configured to control the display screen to be in the second display state.

In some possible implementations, the display state includes a switch state.

In some possible implementations, the apparatus further includes a writing module 205.

The obtaining module 201 is further configured to obtain a plurality of pieces of light quantity data collected by the light sensor during a process of the second user wearing the terminal device.

The writing module 205 is configured to repeatedly write the plurality of pieces of light quantity data into the first light quantity data historical value file according to a preset writing times.

It can be understood that the functions of the function modules and the unit of the control apparatus for the display screen of the embodiments may be specifically implemented according to the method in the foregoing method embodiment, specific implementation process thereof referring to related description of the foregoing method embodiment, which will not be described in more details herein.

In the embodiment of the present disclosure, the obtaining module 201 obtains the target light quantity data collected by the light sensor in the process of the first user wearing the terminal device; the updating module 202 uses the target light quantity data to update the first light quantity data historical value file to obtain the second light quantity data historical value file; the determining module 203 determines the light quantity data threshold by using the second light quantity data historical value file; the controlling module 204 controls the display state of the display screen of the terminal device according to the light quantity data threshold. Therefore, the control unit 204 can adjust the light quantity data threshold conveniently to adapt to different users automatically and achieve to control the display state of the display screen of terminal device accurately.

It should be noted that, for the foregoing various method embodiments, for the sake of brevity, they are all described as a series of action combinations, but those skilled in the art should understand that the present disclosure is not limited by the described action sequence, because certain steps may be performed in other sequences or concurrently in accordance with the present disclosure. Secondly, those skilled in the art should also understand that the embodiments described in the specification are all preferred embodiments, and the actions and modules involved are not necessarily required by the present disclosure.

Figure 3:
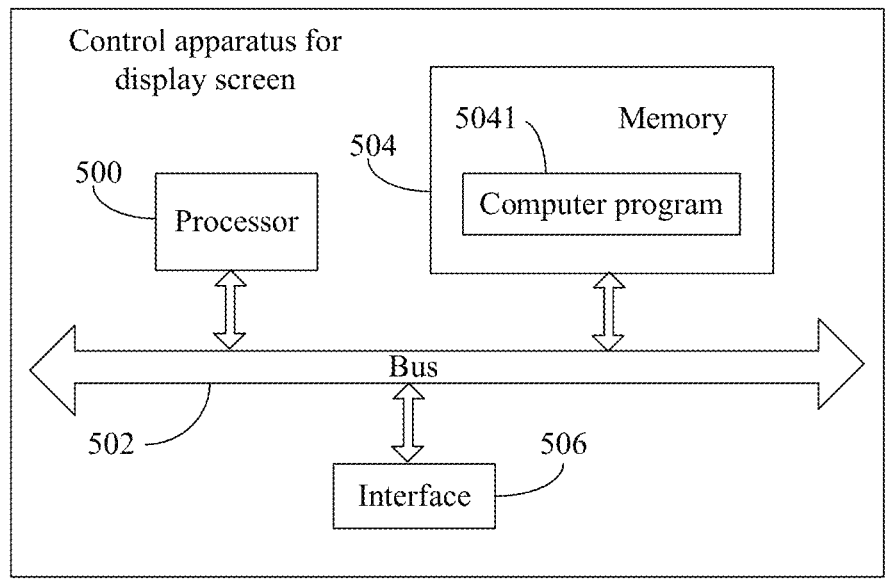
FIG. 3 is a schematic structural diagram of a control apparatus for display screen according to one embodiment of the present disclosure.

As illustrated in FIG. 3, these components illustrated in FIG. 2 can be integrated into a processor 500 for example. The processor 500 may be coupled to a memory 504 and at least one interface 506 by a bus 502. The memory 504 is configured to store at least one computer program 5041 which, when executed by the processor 500, becomes operable with the processor 500 to carry out the methods of the embodiments of the present disclosure. In addition, coupling or communication connection between each illustrated or discussed component may be direct coupling or communication connection, or may be indirect coupling or communication among devices or units by the at least one interface 506, and may be electrical connection, mechanical connection, or other forms of connection.

A person skilled in the art may understand that all or part of the steps of the foregoing embodiments may be implemented by a program to instruct related hardware. The program may be stored in a computer readable storage medium, and the storage medium may include: flash disk, read-only memory (ROM), random access memory (RAM), disk or optical disk.

The above is a preferred embodiment of the present disclosure, and it should be noted that those skilled in the art may make some improvements and modifications without departing from a principle of the present disclosure, and these improvements and modifications are also the protection scope of the present disclosure.

What is claimed is:

1. A control method for a display screen, comprising:
   obtaining target light quantity data collected by a light sensor during a process of wearing a terminal device by a first user;
   updating a first light quantity data historical value file by using the target light quantity data to obtain a second light quantity data historical value file;
   determining a light quantity data threshold by using the second light quantity data historical value file; and
   controlling a display state of the display screen of the terminal device according to the light quantity data threshold.

2. The method according to claim 1, wherein, the target light quantity data comprises a maximum value and a minimum value of the collected light quantity data; and updating the first light quantity data historical value file by using the target light quantity data to obtain a second light quantity data historical value file, comprises:
   adding the maximum value and the minimum value of the collected light quantity data to the first light quantity data historical value file; and
   removing two pieces of light quantity data stored in preset positions from the first light quantity data history value file to obtain the second light quantity data history value file.

3. The method according to claim 2, wherein, determining the light quantity data threshold by using the second light quantity data historical value file, comprises:
   sorting the light quantity data comprised in the second light quantity data historical value file to obtain a third light quantity data historical value file;
   classifying the light quantity data comprised in the third light quantity data historical value file into two categories by using a plurality of preset classification points;
   obtaining an interclass variance of the two categories of light quantity data, and determining a target classification point from the plurality of preset classification points, wherein the interclass variance corresponding to the target classification point is the largest; and
   determining the light quantity data threshold by using the target classification point.

4. The method according to claim 3, wherein, determining the light quantity data threshold by using the target classification point, comprises:
   obtaining an average value of each of two categories of light quantity data classified by the target classification point;

determining the light quantity data threshold according to average values of the two categories of light quantity data.

5. The method according to claim 1, wherein, controlling the display state of the display screen of the terminal device according to the light quantity data threshold, comprises:
obtaining current light quantity data collected by the light sensor;
controlling the display screen of the terminal device to be in a first display state if the current light quantity data is smaller than the light quantity data threshold;
controlling the display screen to be in a second display state if the current light quantity data is greater than or equal to the light quantity data threshold.

6. The method according to claim 1, wherein, the display state comprises a switch state.

7. The method according to claim 1, wherein the method further comprises: before obtaining the target light quantity data collected by the light sensor during the process of wearing the terminal device by the first user,
obtaining a plurality of pieces of light quantity data collected by the light sensor during a process of wearing the terminal device by a second user;
writing the plurality of pieces of light quantity data repeatedly into the first light quantity data history value file according to a preset writing times.

8. A control apparatus for a display screen, comprising a processor, a memory, and a bus, the processor being coupled to the memory by the bus, the memory being configured to store at least one computer program which, when executed by the processor, becomes operational with the processor to:
obtain target light quantity data collected by a light sensor during a process of wearing a terminal device by a first user;
update a first light quantity data historical value file by using the target light quantity data to obtain a second light quantity data historical value file;
determine a light quantity data threshold by using the second light quantity data historical value file;
control a display state of the display screen of the terminal device according to the light quantity data threshold.

9. The apparatus according to claim 8, wherein, the target light quantity data comprises a maximum value and a minimum value of the collected light quantity data, and the computer program, when executed by the processor, further becomes operational with the processor to:
add the maximum value and the minimum value of the collected light quantity data to the first light quantity data historical value file;
remove two pieces of light quantity data stored in preset positions from the first light quantity data history value file to obtain the second light quantity data history value file.

10. The apparatus according to claim 9, wherein, the computer program, when executed by the processor, further becomes operational with the processor to:
sort the light quantity data comprised in the second light quantity data historical value file to obtain a third light quantity data historical value file;
separately classify the light quantity data comprised in the third light quantity data historical value file into two categories by using a plurality of preset classification points;
obtain an interclass variance of two categories of light quantity data;
determine a target classification point from the plurality of preset classification points, and determine the light quantity data threshold by using the target classification point, wherein, the interclass variance corresponding to the target classification point is the largest.

11. The apparatus according to claim 10, wherein, the computer program, when executed by the processor, further becomes operational with the processor to:
obtain an average value of each of two categories of light quantity data classified by the target classification point;
determine the light quantity data threshold according to average values of the two categories of light quantity data.

12. The apparatus according to claim 8, wherein, the computer program, when executed by the processor, further becomes operational with the processor to:
obtain current light quantity data collected by the light sensor;
control the display screen of the terminal device to be in a first display state if the current light quantity data is smaller than the light quantity data threshold;
control the display screen to be in a second display state if the current light quantity data is greater than or equal to the light quantity data threshold.

13. The apparatus according to claim 8, wherein, the display state comprises a switch state.

14. The apparatus according to claim 8 wherein, the computer program, when executed by the processor, further becomes operational with the processor to
obtain a plurality of pieces of light quantity data collected by the light sensor during a process of wearing the terminal device by a second user;
write the plurality of pieces of light quantity data repeatedly into the first light quantity data historical value file according to a preset writing times.

15. A non-transitory computer-readable storage medium storing at least one computer program which, when executed by a processor, causes the processor to carry out actions:
obtaining target light quantity data collected by a light sensor during a process of wearing a terminal device by a first user;
updating a first light quantity data historical value file by using the target light quantity data to obtain a second light quantity data historical value file;
determining a light quantity data threshold by using the second light quantity data historical value file; and
controlling a display state of the display screen of the terminal device according to the light quantity data threshold.

16. The non-transitory computer-readable storage medium according to claim 15, wherein, the target light quantity data comprises a maximum value and a minimum value of the collected light quantity data; and updating the first light quantity data historical value file by using the target light quantity data to obtain a second light quantity data historical value file, comprises:
adding the maximum value and the minimum value of the collected light quantity data to the first light quantity data historical value file; and
removing two pieces of light quantity data stored in preset positions from the first light quantity data history value file to obtain the second light quantity data history value file.

17. The non-transitory computer-readable storage medium according to claim 16, wherein, determining the light quantity data threshold by using the second light quantity data historical value file, comprises:

sorting the light quantity data comprised in the second light quantity data historical value file to obtain a third light quantity data historical value file;

classifying the light quantity data comprised in the third light quantity data historical value file into two categories by using a plurality of preset classification points;

obtaining an interclass variance of the two categories of light quantity data, and determining a target classification point from the plurality of preset classification points, wherein the interclass variance corresponding to the target classification point is the largest; and determining the light quantity data threshold by using the target classification point.

18. The non-transitory computer-readable storage medium according to claim 17, wherein, determining the light quantity data threshold by using the target classification point, comprises:

obtaining an average value of each of two categories of light quantity data classified by the target classification point;

determining the light quantity data threshold according to average values of the two categories of light quantity data.

19. The non-transitory computer-readable storage medium according to claim 15, wherein, controlling the display state of the display screen of the terminal device according to the light quantity data threshold, comprises:

obtaining current light quantity data collected by the light sensor;

controlling the display screen of the terminal device to be in a first display state if the current light quantity data is smaller than the light quantity data threshold;

controlling the display screen to be in a second display state if the current light quantity data is greater than or equal to the light quantity data threshold.

20. The non-transitory computer-readable storage medium according to claim 15, wherein, before obtaining the target light quantity data collected by the light sensor during the process of wearing the terminal device by the first user, the at least one computer program further causes the processor to carry out actions:

obtaining a plurality of pieces of light quantity data collected by the light sensor during a process of wearing the terminal device by a second user;

writing the plurality of pieces of light quantity data repeatedly into the first light quantity data history value file according to a preset writing times.

* * * * *